US011815172B2

(12) United States Patent
Cariccia et al.

(10) Patent No.: US 11,815,172 B2
(45) Date of Patent: Nov. 14, 2023

(54) FILTERING PULLEY

(71) Applicant: DAYCO EUROPE S.R.L., Chieti (IT)

(72) Inventors: Gianluca Cariccia, Turin (IT); Andrea Guala, Biella (IT); Ettore Gaude, Chieti (IT); Gregorio Luciani, Chieti (IT)

(73) Assignee: Dayco Europe S.R.L., Chieti (IT)

( * ) Notice: Subject to any disclaimer, the term of this patent is extended or adjusted under 35 U.S.C. 154(b) by 848 days.

(21) Appl. No.: 16/487,922

(22) PCT Filed: Feb. 23, 2018

(86) PCT No.: PCT/IB2018/051149
§ 371 (c)(1),
(2) Date: Aug. 22, 2019

(87) PCT Pub. No.: WO2018/154509
PCT Pub. Date: Aug. 30, 2018

(65) Prior Publication Data
US 2020/0208728 A1     Jul. 2, 2020

(30) Foreign Application Priority Data
Feb. 24, 2017    (IT) ........................ 102017000021137

(51) Int. Cl.
*F16H 55/36*     (2006.01)
*F16F 15/123*     (2006.01)
(Continued)

(52) U.S. Cl.
CPC ......... *F16H 55/36* (2013.01); *F16F 15/1234* (2013.01); *F02B 67/06* (2013.01);
(Continued)

(58) Field of Classification Search
CPC ....... F16H 2055/366; F16H 2045/0226; F16H 55/36; F16F 15/1234; F16F 15/126; F16F 1/047
See application file for complete search history.

(56) References Cited

U.S. PATENT DOCUMENTS 2,723,573 A * 11/1955 Dillman .................. F16H 55/36
74/574.4
5,279,900 A * 1/1994 Takeuchi ................ B32B 15/06
428/492
(Continued)

FOREIGN PATENT DOCUMENTS

DE     102008043250 A1 * 5/2010
DE     102011087879 A1 * 6/2012
(Continued)

OTHER PUBLICATIONS

PCT, International Search Report with Written Opinion; International Application No. PCT/IB2018/051149 (dated Apr. 19, 2018) (13 Pages).

*Primary Examiner* — Daniel D Yabut
(74) *Attorney, Agent, or Firm* — FisherBroyles, LLP; Susan M. Oiler

(57) ABSTRACT

Filtering pulleys have a hub adapted to be fixed to a rotating shaft, a ring assembled coaxial and rotationally free on the hub, and an elastic assembly arranged circumferentially with respect to the hub and the ring and interposed between a pair of first elements integral with the hub and between a pair of second elements integral with the ring. The elastic assembly includes an elastic element having a progressive rigidity increasing starting from a predetermined threshold value of the angle of relative rotation between the hub and the ring.

14 Claims, 5 Drawing Sheets

(51) Int. Cl.
  *F02B 67/06* (2006.01)
  *F16F 1/04* (2006.01)
  *F16F 15/126* (2006.01)
  *F16H 45/02* (2006.01)

(52) U.S. Cl.
  CPC ............ *F16F 1/047* (2013.01); *F16F 15/126* (2013.01); *F16H 2045/0226* (2013.01); *F16H 2055/366* (2013.01)

(56) References Cited

U.S. PATENT DOCUMENTS

| | | | | |
|---|---|---|---|---|
| 5,449,322 | A | * 9/1995 | Wagner | ............... F16F 15/1442 464/90 |
| 2008/0300098 | A1 | * 12/2008 | Serkh | ................. F16F 15/1442 475/347 |
| 2017/0023096 | A1 | 1/2017 | Hertel et al. | |
| 2017/0102037 | A1 | * 4/2017 | Davis | .................... F16F 15/123 |
| 2017/0268590 | A1 | * 9/2017 | Senoue | ............. F16F 15/12346 |

FOREIGN PATENT DOCUMENTS

| | | | |
|---|---|---|---|
| FR | 2495256 A | * | 6/1982 |
| WO | WO-9844273 A1 | * | 10/1998 |
| WO | 2014/056097 A1 | | 4/2014 |
| WO | 2015/010187 A1 | | 1/2015 |
| WO | WO-2016151455 A1 | * | 9/2016 |

* cited by examiner

FILTERING PULLEY

CROSS-REFERENCE TO RELATED APPLICATIONS

The present invention is filed under 35 U.S.C. § 371 as the U.S. National Phase of International Patent Application No. PCT/IB2018/051149, filed Feb. 23, 2018, which designated the United States and which claims the benefit of Italian Patent Application No. 102017000021137, filed on 24 Feb. 2017, the disclosure of which is incorporated by reference.

TECHNICAL FIELD

The present invention concerns a filtering pulley, preferably a pulley for a crank shaft in an accessory transmission of an internal combustion engine.

BACKGROUND ART

As is known, the drive shaft in internal combustion engines is subject to torsional vibrations due to the periodic stress caused by combustion in the cylinders. Said vibrations are particularly intense at start-up and at low engine speeds, and also in the presence of particular construction solutions, such as the use of double-clutch gearboxes or start-stop systems.

The torsional vibrations result in rotation irregularities of the accessory transmission drive pulley which are transmitted to the accessories through the drive belt, which is therefore subject to periodical variations in tension.

In order to "filter" the torsional oscillations transmitted by the crank shaft to the belt, a filtering pulley is generally used as drive pulley provided with a hub integral with the drive shaft, a ring cooperating with the belt and one or more elastic elements through which the torque is transmitted from the hub to the ring.

To effectively filter the oscillations, the rigidity of the elastic elements should be low; however, the high loads absorbed by the accessories do not allow the rigidity to be lowered below a certain limit. The need is therefore felt in the sector to develop improved filtering pulleys which satisfy the conflicting needs described above.

DISCLOSURE OF INVENTION

The object of the present invention is to provide a filtering pulley that solves the above-mentioned technical problem in a simple and inexpensive manner.

The above-mentioned object is achieved by a filtering pulley that has a hub adapted to be fixed to a rotating shaft, a ring assembled coaxial and rotationally free on the hub, an elastic assembly arranged circumferentially with respect to the hub and the ring and interposed between a pair of first elements integral with the hub and between a pair of second elements integral with the ring. The elastic assembly has one elastic element having a progressive rigidity increasing starting from a predetermined threshold value of the angle of relative rotation between the hub and the ring.

BRIEF DESCRIPTION OF THE DRAWINGS

For a better understanding of the present invention, a preferred embodiment is described below, by way of non-limiting example and with reference to the accompanying drawings, in which.

BEST MODE FOR CARRYING OUT THE INVENTION

Figure 1:
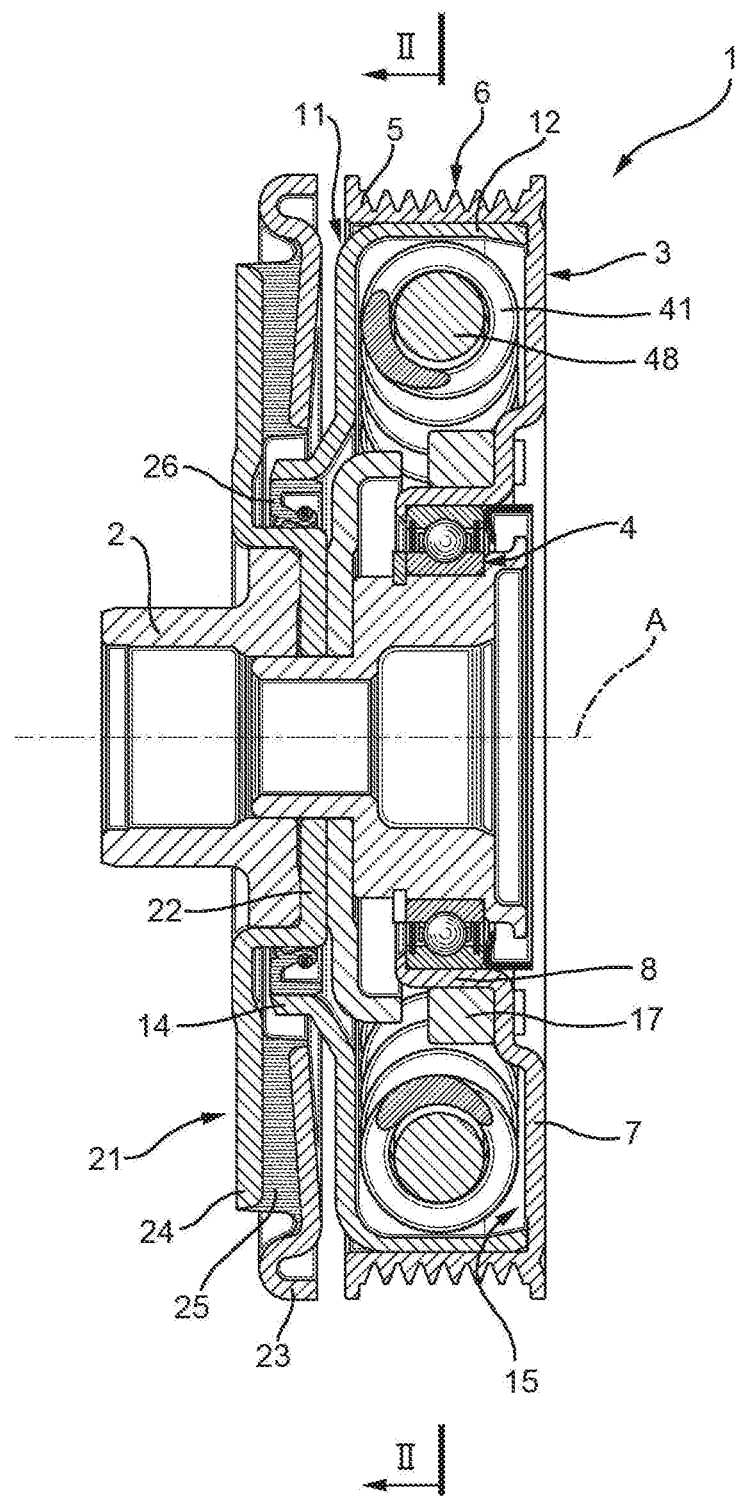
FIG. 1 is a diametral section of a pulley according to the invention.
Figure 2:
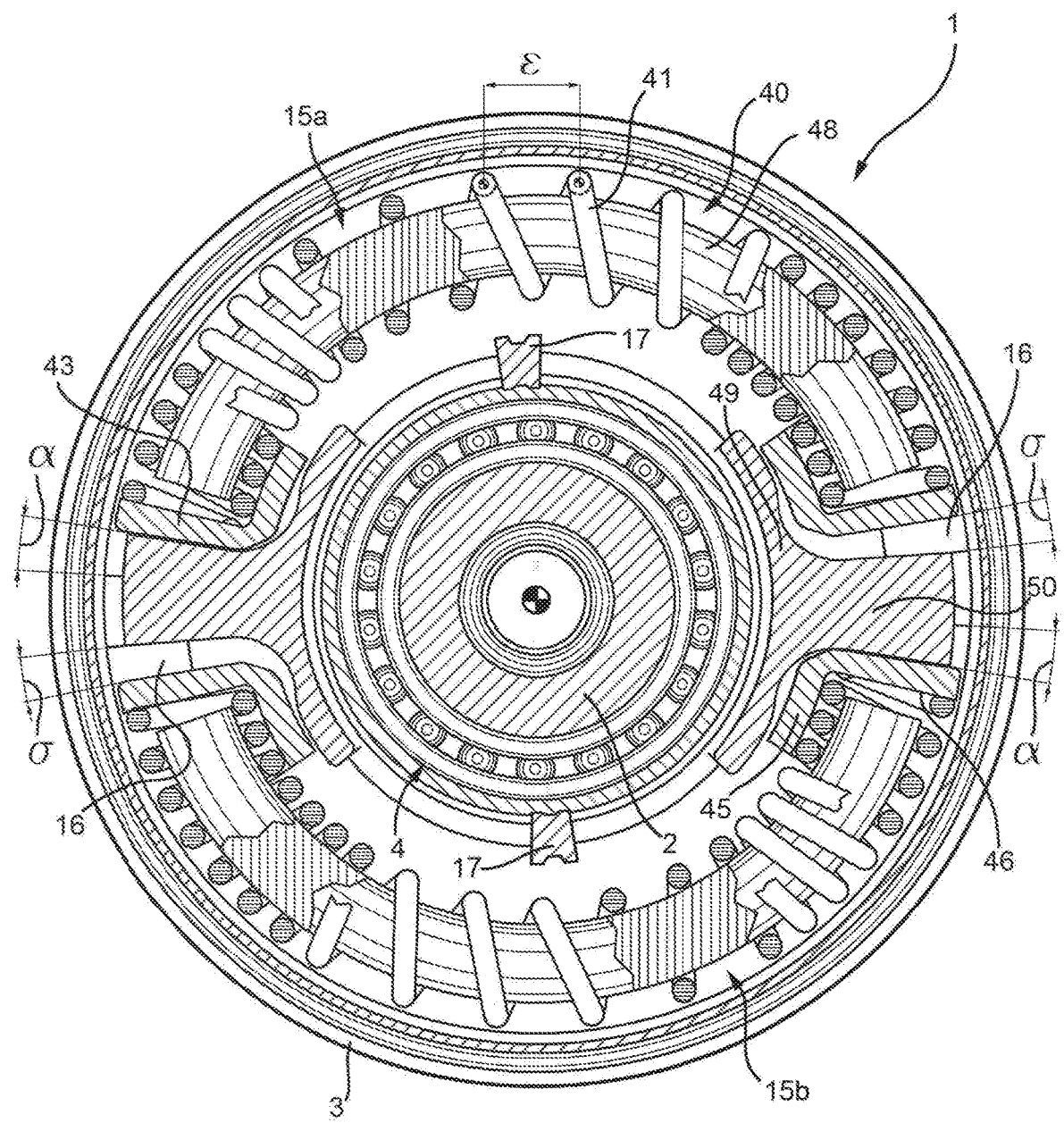
FIG. 2 is a section according to the line III-III of FIG. 1.

FIGS. 1 and 2 show a filtering pulley 1 comprising a hub 2 with axis A, adapted to be connected to a shaft (not shown), for example a crank shaft of an internal combustion engine, and a ring 3 externally coaxial with the hub 2 and supported in a rotationally free manner on the hub 2 by means of a bearing 4, preferably a rolling bearing.

The ring 3 comprises an annular portion 5 provided with a profile 6 adapted to cooperate with a poly-V belt (not shown). The ring 3 further comprises a radial wall 7, integral with the annular portion 5 and preferably in one single piece with it, extending radially towards the hub 2, and a substantially cylindrical internal wall 8 with axis A.

The ring 3 carries, integral with it, a closing element 11 comprising an external cylindrical wall 12 with axis A, a flat radial annular wall 13 and an internal cylindrical wall 14 with axis A, extending cantilever from the wall 13 on the opposite side of the cylindrical wall 12. The closing element 11 is press-fitted into the ring 3 so as to form an annular chamber 15 radially ranging between the wall 12 and the wall 8 and axially delimited by the wall 7 and by the wall 13.

Lastly, the closing element 11 comprises two diametrically opposite protrusions 16 extending axially inside the chamber 15 starting from the wall 13 (see FIG. 2). The protrusions 16 divide the chamber 15 into two portions 15a, 15b of equal dimensions.

On the wall 7 a further two protrusions 17 are provided carried fixed by said wall or, alternatively, made in one piece with the same, preferably arranged at 180° relative to the protrusions 16, therefore substantially halfway along the respective portions 15a, 15b of the chamber 15.

The pulley 1 is further provided with a dynamic damper 19 comprising a disc 21, facing the closing element 11 and having a portion of hub 22 integral with the hub 2, and a seismic ring 23 constrained to a perimeter flange 24 of the disc 21 by a ring 25 of elastomeric material.

Furthermore, the pulley 1 can comprise a dust seal 26 between the wall 14 of the closing element 11 and the portion of hub 22 of the damper 19.

As illustrated in FIG. 2, the pulley 1 further comprises at least one elastic assembly 40, for example two arcuate elastic assemblies 40 arranged circumferentially free in the respective portions 15a, 15b of the chamber 15 delimited by the protrusions 16.

In a first embodiment, illustrated in FIGS. 1 and 2, the travel of the elastic assemblies 40 in the respective portions 15a, 15b is defined by an angular clearance a present between each of the elastic assemblies 40 arranged in contact with one of the protrusions 16 and the other protrusion 16.

Each of the elastic assemblies 40 comprises at least a spring, in the case described an arcuate helical spring 41 assembled between respective end sliding blocks 43.

The sliding blocks 43 each comprise an arcuate portion 45 which internally surrounds an end portion of the respective spring 41, and a head 46 defining an axial support for said end portion.

Each elastic assembly 40 can further comprise an anti-warping element 48 for the spring 41, consisting essentially of an arcuate cylinder made of polymeric material, coaxial with the spring 41 and housed with a slight interference inside said spring 41.

During the pack compression of the spring 41, the anti-warping element 48 does not allow the coils of the spring 41 to overlap.

Advantageously the spring 41 is configured to have a progressive rigidity increasing from 0 when the spring is free and, ideally, to infinity when the spring is compressed.

Figure 6A:
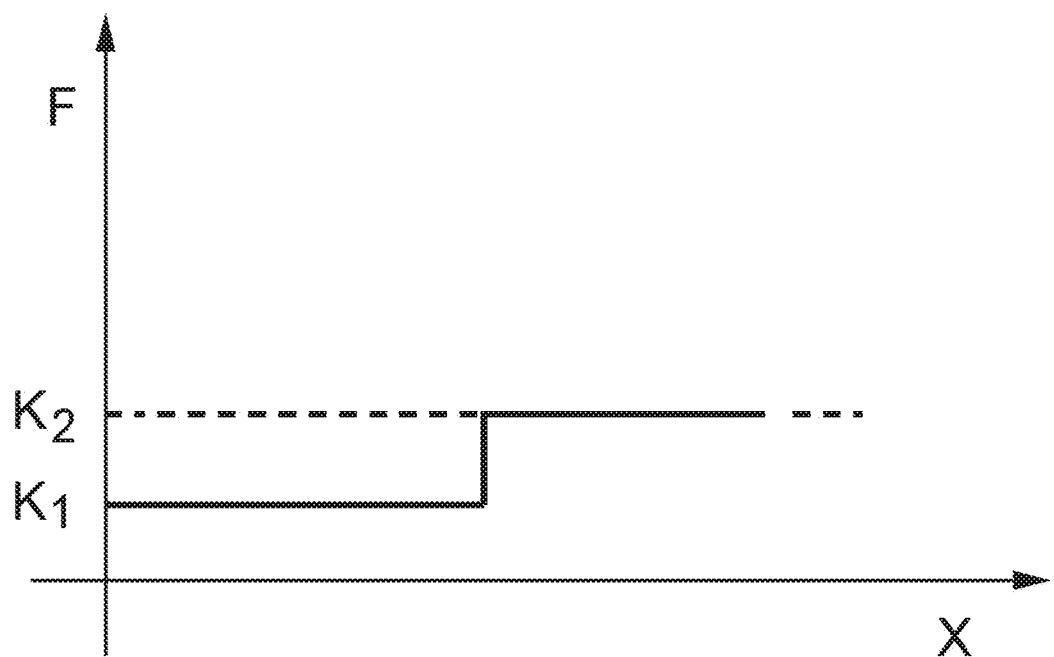
FIGS. 6a-6b are graphs showing the different types of rigidity.
Figure 6B:
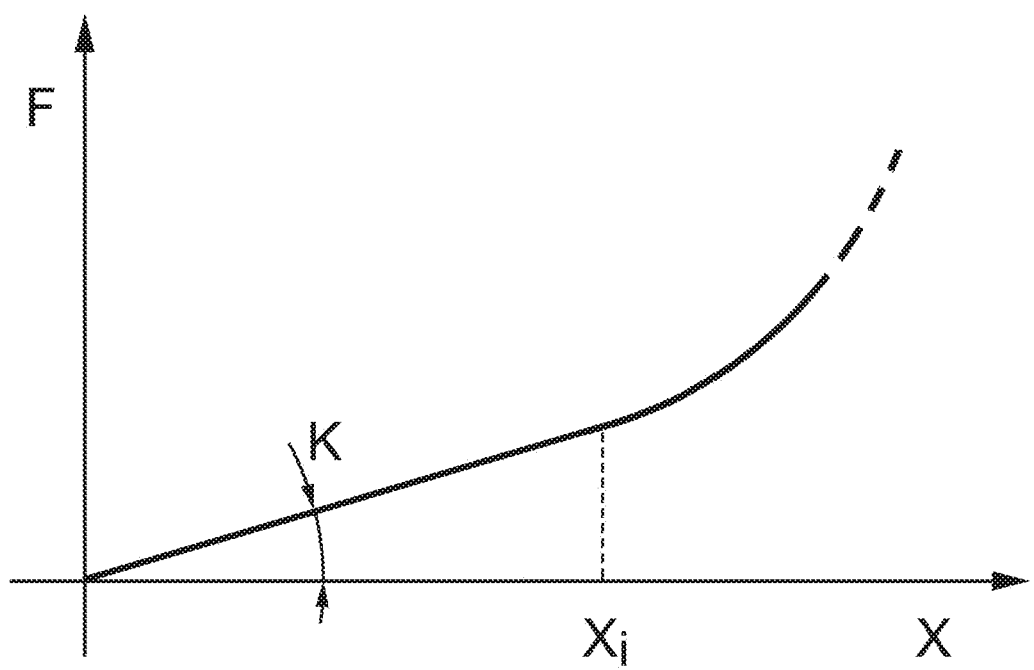

With reference to FIG. 6b, by progressive rigidity we mean a rigidity having a continuously increasing value, preferably a rigidity having a first rectilinear portion with rigidity K and a portion exponentially increasing, but continuous relative to the first portion, starting from a predetermined compression value $x_i$.

Said rigidity is substantially different from the rigidity of a non-progressive spring. For example, with reference to FIG. 6a, in which the rigidity of two non-progressive springs in series is illustrated, the rigidity will first be constant equal to $K_1$, i.e. the rigidity value of the spring having lower rigidity, and will then go to the constant value $K_2$, i.e. the value of the spring with higher rigidity, the first spring being compressed.

The progressive rigidity can be obtained by means of a helical spring 41 having a variable distance between the coils thereof. Preferably the distance varies parabolically along the length of the spring 41, increasing from a minimum initial end value to a maximum value located substantially in an intermediate position relative to the entire length of the spring 41.

Alternatively, the characteristic indicated above can be obtained by means of a variable wire spring 41, not illustrated, or with a combination of variable wire and pitch.

The pulley 1 again comprises an actuator 49 axially interposed between the hub 2 and the disc 21 of the dynamic damper 19 and integral with them. The actuator 49 has two spokes 50 free to move circumferentially in the chamber 15 and adapted to interact with the elastic assemblies 40.

Assuming that the actuator 49 is arranged so that each of the spokes 50 is in contact with one of said elastic assemblies 40, the angle ranging between each of the spokes 50 and each of the elastic assemblies 40 will be equal to σ.

The operation of the pulley 1 is described below with reference to the graph of FIG. 3, which shows the torque transmitted by the pulley 1 as a function of the angle of relative rotation between the ring 3 and the hub 2.

In a first operating phase, in said driving mode constituting the normal operation of the pulley 1, when the drive shaft drives the accessories, the speed of the hub 2 tends to exceed the speed of the ring 3. For this reason, the spokes 50 of the actuator 49, once the angle β given by the sum of the described angles α and σ has been exceeded, transmit the torque to the protrusions 16 with the interposition of the respective elastic assemblies 40.

As the torque transmitted increases, the elastic deformation of the springs 41 increases; the relation between torque and angle of rotation therefore depends on the spacing between the coils of the spring 41. Preferably, said characteristic is substantially linear up to a predetermined value according to design requirements, and then drastically increases in a substantially exponential manner.

Figure 3:
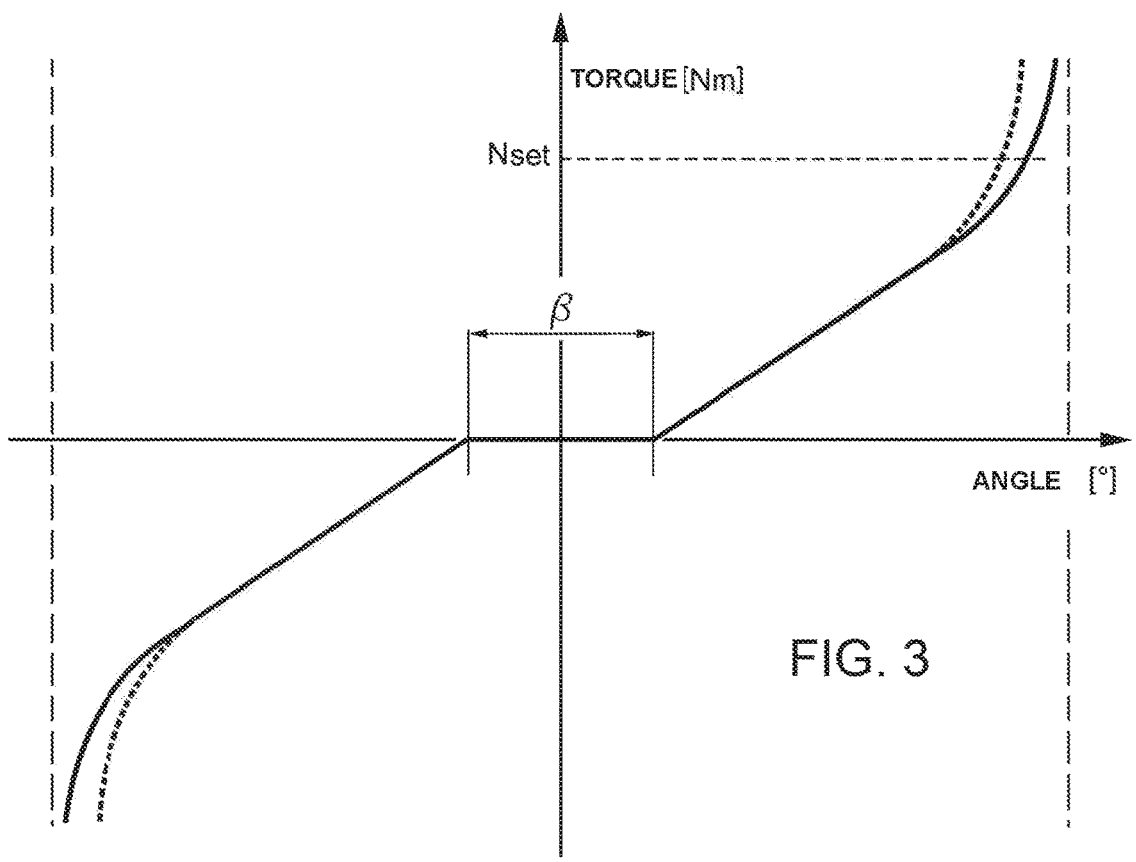
FIG. 3 is a graph showing the torque transmitted by the pulley of FIG. 1 according to its angle of rotation.

If present, as illustrated by the broken-line curve in FIG. 3, the anti-warping device 48 exerts its action at lower torque values, exponentially increasing the energy absorbed by it. During said absorption of energy, by compression, the device does not allow the coils of the spring 41 to overlap.

The above occurs, symmetrically, in the overrunning condition, i.e. when the speed of the ring 3 tends to exceed the speed of the hub 2.

In the event of important angle variations which could damage the elastic assemblies 40, the protrusions 17 prevent an excessive relative rotation between hub 2 and ring 3.

Figure 4:
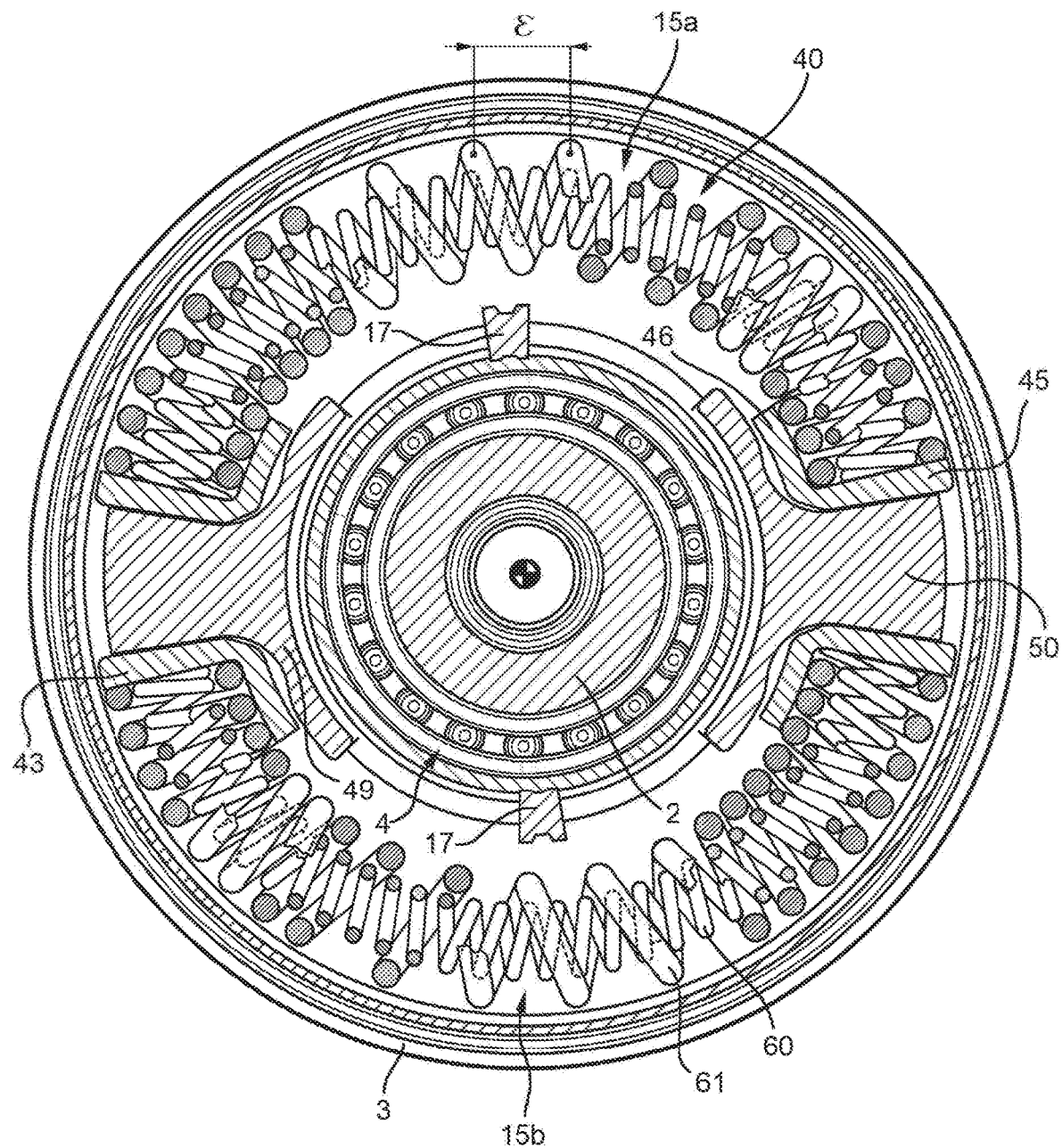
FIG. 4 is an alternative section view of a second embodiment of the pulley according to the invention.

FIG. 4 illustrates a section view of a possible variation of the pulley described above, in which the elements with the same reference number refer to elements identical to those described for the variation of FIGS. 1 and 2 and not repeated for the sake of brevity.

In said variation the clearances σ, σ are absent or at least are of a width such as to allow assembly of the elastic assemblies 40 and the actuator 49 without interference.

In said variation the elastic assemblies 40 comprise a first spring 60 and a second spring 61, the two springs 60 and 61 are coaxial to each other. Advantageously a first spring 60 is positioned inside the second spring 61.

Preferably the springs 60 and 61 have different rigidities; the internal spring 60 has a constant linear rigidity whereas the external spring 61 is of the progressive rigidity type, as described before, having a variable distance between the spring coils.

In this case the spring 60 does not comprise an anti-warping device 48 within it as described before; at the same time the spring 60 acts as an anti-warping device for the external spring 61.

Figure 5:
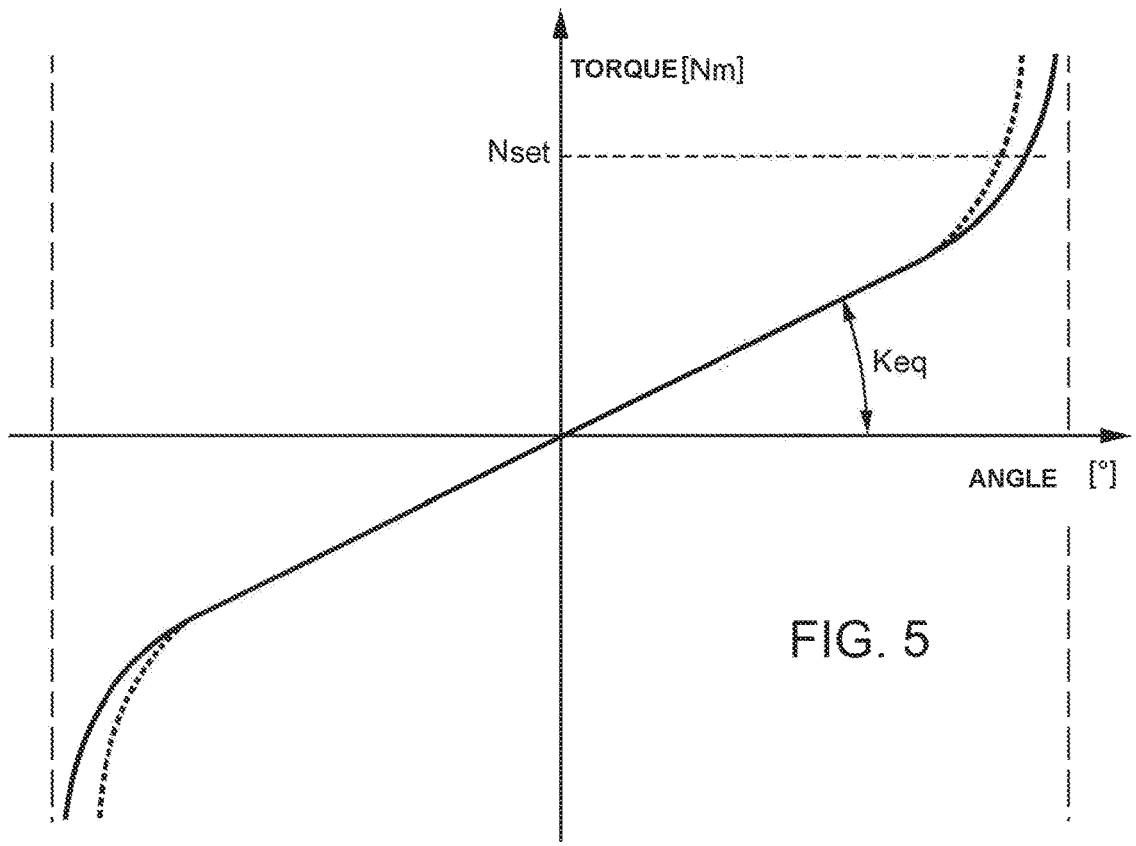
FIG. 5 is a graph showing the torque transmitted by the pulley of FIG. 4 according to its angle of rotation.

The operation of the pulley 1 is described below with reference to the graph of FIG. 5, which shows the torque transmitted by the pulley 1 as a function of the angle of relative rotation between the ring 3 and the hub 2.

In a first operating phase, called driving mode and constituting the normal operation of the pulley 1, when the drive shaft drives the accessories, the speed of the hub 2 tends to exceed the speed of the ring 3. For this reason, the spokes 50 of the actuator 49 transmit the torque to the protrusions 16 with the interposition of the respective elastic assemblies 40.

As the torque transmitted increases, the elastic deformation of the springs 60,61 increases. In this case the characteristic has a first part having a slope equal to the equivalent rigidity $K_{eq}$ of the springs 60, 61, positioned parallel to each other, and a second part, as in the previous case, comprising an exponential increase.

If present, as illustrated by the broken-line curve, the anti-warping device 48 exerts its action as illustrated for the variation of FIGS. 1 and 2.

The above occurs, symmetrically, in the overrunning condition, i.e. when the speed of the ring 3 tends to exceed the speed of the hub 2.

The advantages of a pulley 1 according to the invention are therefore evident.

The presence of a spring 41 with progressive rigidity provides a spring having at the same time a high rigidity for high torques and a lower rigidity for low torques in a simple, compact and inexpensive manner.

By varying the distance between the coils of the spring 41 it is possible to vary the characteristic of the spring according to design requirements.

The elastic assemblies 40 can also comprise traditional springs, 61, the rigidity of which can be combined, in parallel or in series, with that of the spring 41 with progressive rigidity, increasing the number and type of characteristics that can be obtained.

The use of an anti-warping device allows the reliability of the system to be improved, preventing any warping of the springs 41.

Lastly, it is clear that modifications or variations that do not depart from the protective scope defined by the claims can be made to the pulley 1 described.

Firstly, the pulley could be used not exclusively on the crank shaft of an internal combustion engine but for one of the accessories thereof.

With reference to the elastic assembly 40, the sliding blocks 43 and the anti-warping element 48 could be produced differently but without modifying their function, or be absent. Or, again, there could be a plurality of elastic assemblies 40, for example four in groups of two.

As already said, several springs could be present, positioned in series or parallel to one another, on condition that at least one of them is a spring with progressive rigidity.

The dynamic damper 19 could be absent. Lastly, the opening 18 and the angle intervals α, σ could have different width according to the torsional dynamic behaviour of the drive shaft in the specific application.

Again, one or more damping devices could be present, not described in the above-mentioned embodiment for the sake of brevity, but well known to a person skilled in the art.

The invention claimed is:

1. A filtering pulley comprising;
    a hub adapted to be fixed to a rotating shaft, the hub having a first portion and a second portion,
    a ring assembled coaxial and rotationally free on a first portion of said hub, wherein the ring carries a closing element that has an annular flange seated inside the ring and an opposing annular flange extending away from the ring;
    a disc seated axially interposed between the first portion and second portion of said hub;
    an actuator axially interposed between the first portion of said hub and said disc, wherein the actuator extends radially beyond a gap formed between said opposing annular flange of said closing element and said disc;
    a dust seal seated in said gap in a sealing engagement with said opposing annular flange of said closing element and with said disc; and
    at least one elastic assembly arranged circumferentially with respect to said hub and to said ring and each interposed between a pair of first elements integral with said actuator which rotates with said hub and between a pair of second elements integral with said ring,
    characterized in that said at least one elastic assembly comprises a first wire coil spring having a progressive rigidity from a minimum initial end value at both of a first end and a second end thereof according to a parabolic trend with a maximum value between the first and second ends, wherein the progressive rigidity increases from a predetermined threshold value of the angle of relative rotation between said hub and said ring, and, as graphically represented by force (F) versus extension of the spring (X), has a continuously increasing value having a first rectilinear portion and then a second portion where K increases exponentially; and
    wherein each at least one elastic assembly forms with said first elements and with said second elements respective angular clearances (σ, α), said ring and said hub-having a free angle (β) of relative rotation equal to the sum of said angular clearances (σ, α).

2. The pulley according to claim 1, wherein said progressive rigidity of the wire coil spring is a variation of at least one between the pitch and the section of the wire along the length of said spring.

3. The pulley according to claim 1, wherein said elastic assembly comprises a second spring mutually coaxial with and positioned inside the first wire coil spring.

4. The pulley according to claim 1, wherein said at least one elastic assembly comprises an anti-warping device.

5. The pulley according to claim 4, wherein said anti-warping device comprises an element made of polymeric material housed coaxially inside said at least one first wire coil spring.

6. The pulley according to claim 1, wherein said first elements comprise at least two spokes carried by an actuator integral with the hub.

7. The pulley according to claim 6, wherein said elastic assembly comprises at least the first wire coil spring sliding circumferentially inside a seat formed between said first elements and/or said second elements.

8. The pulley according to claim 1, wherein said second elements are protrusions obtained in an element integral with the ring.

9. The pulley according to claim 1, wherein said disc is part of a dynamic damper.

10. The pulley according to claim 9, wherein the disc is rotatable with the hub and has a perimeter flange defining an inward axial face facing the ring, and the disc comprises a seismic ring constrained to the inward axial face of the perimeter flange by a ring of elastomeric material that is coaxial therewith about the hub.

11. The pulley according to claim 10, wherein the seismic ring extends radially outward beyond the perimeter flange of the disc.

12. The pulley according to claim 1, wherein it comprises stop elements carried integral by one between said hub and said ring.

13. The pulley according to claim 1, wherein said dust seal is has a V-ring cross-sectional profile.

14. The pulley according to claim 1, wherein said pair of first elements integral with said actuator are two spokes free to move circumferentially in the chamber.

* * * * *